C. E. PATRIC.
PLANTING MACHINE.
APPLICATION FILED FEB. 3, 1910.
982,089.
Patented Jan. 17, 1911.
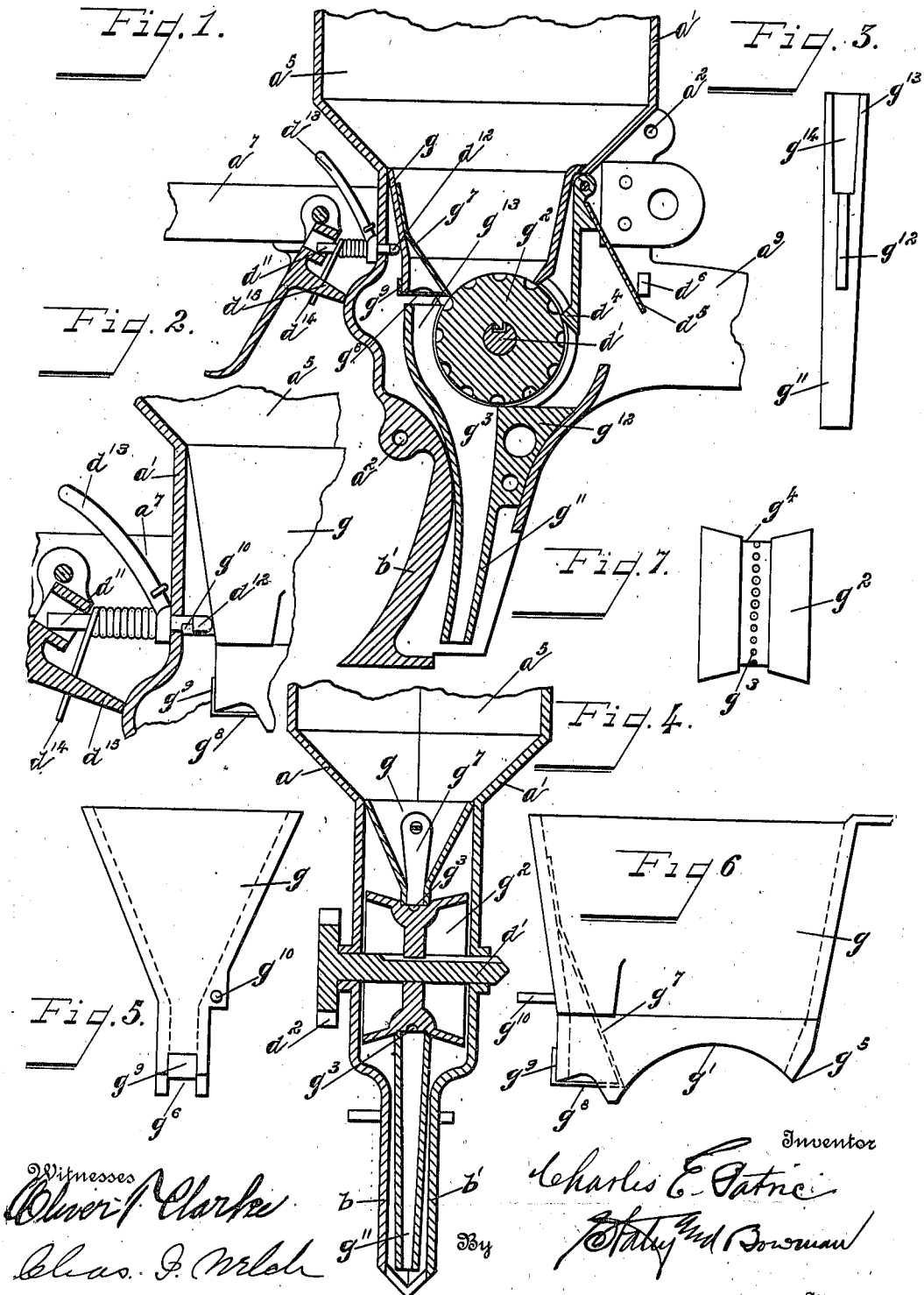

UNITED STATES PATENT OFFICE.

CHARLES E. PATRIC, OF SPRINGFIELD, OHIO.

PLANTING-MACHINE.

982,089.

Specification of Letters Patent.

Patented Jan. 17, 1911.

Original application filed October 2, 1909, Serial No. 520,730. Divided and this application filed February 3, 1910. Serial No. 541,759.

*To all whom it may concern:*

Be it known that I, CHARLES E. PATRIC, a citizen of the United States, residing at Springfield, in the county of Clark and State of Ohio, have invented certain new and useful Improvements in Planting-Machines, of which the following is a specification.

This invention relates to improvements in planting machines and it particularly relates to improvements set forth in my United States Patent No. 899,557, dated Sept. 29, 1909; this application being a division of my pending application Ser. No. 520,730.

The object of my invention is to provide improved means for planting the finer seeds so as to cause said seeds to be fed and deposited in the furrow in a more uniform manner.

A further object of the invention is to improve and simplify the construction and make more effective the operation of devices of this character.

The invention consists in the constructions and combinations of parts hereinafter described and set forth in the claims.

In the accompanying drawings:—Figure 1 is a longitudinal sectional view of the main hopper casing, auxiliary hopper seeding device, grain conduit and furrow opener. Fig. 2 is an enlarged section in detail of the locking device for the auxiliary hopper. Fig. 3 is a detail of the auxiliary conduit. Fig. 4 is a vertical transverse sectional view of the hopper casing, auxiliary hopper, seeding devices, conduit and furrow opener. Fig. 5 is an end view of the auxiliary hopper. Fig. 6 is a side view of the auxiliary hopper. Fig. 7 is a detail of the feed wheel.

Like parts are represented by similar characters of reference in the several views.

The general construction and operation of the present machine is the same as that set forth in my prior patent referred to, and a brief description of which is given in my pending application, it being deemed sufficient in the present case to only show the feeding device for the seed in connection with the casing for the same, my present invention relating simply to the seed feeding device.

In the said drawings: $a$ and $a'$ represent the casing, constructed in two parts connected together by suitable fastening devices as at $a^2$. The upper portion of each casing member is enlarged to form a hopper as shown at $a^5$. The lower part of each casing member has integrally formed thereon one-half of the furrow opening device $b$ and $b'$.

$a^7$ and $a^9$ represent forwardly and rearwardly extending portions on the respective casing members to which the respective carrying wheels are journaled.

As in my former patent referred to, the feeding or distributing wheel is located in the casing or hopper and is splined to an operating or feed-shaft $d'$ which derives its movement from the rear carrying wheel, said shaft having a pinion $d^2$ integrally connected to one end thereof through which the motion is transmitted. The ends of the distributing wheel fit freely between the sides of the casing and on the rear side of the wheel there is extended from the casing a convex projection $d^4$ conforming to the concave-shaped periphery of the wheel so as to close the space between the casing and the wheel at this point, this projection $d^4$ being in the nature of a spring-pressed pivoted plate adapted to fit snugly but freely against the periphery of the wheel, a spring $d^5$ secured to the upper end of the plate and bearing against the lug $d^6$ projecting from one of the frame extensions being employed for the purpose (Fig. 1). This yieldable plate permits the ready insertion of the feed wheel; it being the intention to provide a number of interchanging wheels with different sized pockets and in some cases with more than one series of pockets. As before stated, the feed wheel is splined to the operating shaft $d'$ so that the wheel may be readily removed by simply withdrawing the shaft, which is held in position in a manner described in my former patent referred to.

In planting some kinds of seed, I employ a check plate having a yieldable valve or gate which is described in my former patent, and which closes the space between the feed wheel and the forward side of the casing. As explained in my pending application this plate is made removable so that it can be readily taken out for the substitution of the device which forms the subject matter of this application and which will now be explained. These devices are intended to be used when it is desired to sow the finer seeds and consists of a removable auxiliary or sub-hopper and sub-conduit and the special form of feed wheel previously referred to. The hopper $g$ is constructed at the top of a length and breadth equal to the size of the bottom of the main hopper proper and forms in effect a continuation of said main hopper portion. The sides of the auxiliary hopper are converged as shown in Fig. 5 and the bottom edges thereof formed on the arc of a circle corresponding to the circumference of the feed wheel so as to provide a narrow elongated curved discharge opening $g'$. The feed wheel which I employ in connection with this auxiliary hopper is shown in detail in Fig. 7 and indicated by $g^2$. The seed cells, $g^3$, of this feed wheel are located in a central depression indicated by $g^4$, this depression being of a width slightly greater than the width of the bottom of the auxiliary hopper, which fits freely therein. One end of the hopper is extended down so as to fit snugly against the depressed periphery of the feed wheel as indicated at $g^5$. The other end is removed from the periphery of the feed wheel so as to leave an open space as indicated at $g^6$, and this space is normally closed by the resilient gate $g^7$, which consists of a flat spring secured to the end of hopper and extended down at an angle to the depressed periphery of the feed wheel, thence forwardly as indicated at $g^8$, and provided with an up-turned end $g^9$, to act as a stop against the end of the casing. This spring serves to prevent cutting the seed if two seeds should happen to get into the cell or if an extra large seed should project out from the pocket, by yielding sufficiently to permit the seed or seeds to pass the same. Projecting from the forward end of the hopper is a small pin, $g^{10}$, over which the hook-shaped end $d^{12}$ of the spring operated rod $d^{11}$, engages to hold the sub-hopper in place; the bottom of the sub-hopper being held in gentle contact with the periphery of the feed wheel so as to obviate any undue friction, at the same time permitting the ready insertion and removal of the hopper. By having the bottom of the hopper converged so as to form a narrow opening which fits in the depressed center of the feed wheel, forming a close fit therewith, leakage and unnecessary friction between the seed and the feed wheel is prevented.

The removable sub-conduit is represented by $g^{11}$, and is adapted to be inserted in the main conduit of the furrow opener, said sub-conduit having a rearwardly projecting flange, $g^{12}$, which fits against the rear wall of the main conduit and assists in supporting the sub-conduit in position. The upper end of the sub-conduit is provided with an extension, $g^{13}$, curved to conform to the contour of the periphery of the feed wheel and that side of the extension adjacent said wheel is formed open, as well as the top thereof, as indicated at $g^{14}$; the top of said extension being extended up in proximity to the yieldable gate in the sup-hopper. The bottom of this conduit is extended down to a point near the lower end of the furrow opener and the discharge opening thereof is much smaller than the discharge opening of the main conduit, thus preventing lateral scattering of the seed and permitting the seed to be deposited at regular intervals in a straight line.

The rod, $d^{11}$ previously referred to is provided with an operating lever, $d^{13}$, located on the outside of the casing. This rod is supported at one end by the casing $a'$ and at the other end, in the present instance, by a scraper for the front carrying wheel. A spring, $d^{14}$ coiled about said rod with one of its ends bearing against the projection, $d^{15}$, on the scraper and the other against the handle or lever $d^{13}$, normally tends to push the hook-shaped end of the rod over toward locking position so as to yieldingly engage the pin $g^{10}$ of the auxiliary hopper and hold said hopper yieldingly against the feed wheel.

Having thus described my invention, I claim:

1. In a seeding machine, a casing having a main hopper, a revoluble feed wheel located in said casing, and a removable auxiliary hopper, said auxiliary hopper being fitted to the periphery of said feed wheel and having a yieldable spring pressed gate adjacent thereto, substantially as specified.

2. In a seeding machine, a casing having a main hopper, a revoluble feed wheel located in said casing, a removable auxiliary hopper, said auxiliary hopper having a converged open lower end conforming to the contour of the periphery of said feed wheel, and a yieldable spring pressed gate in the lower end of said auxiliary hopper adjacent said wheel, substantially as specified.

3. In a seeding machine, a casing having a main hopper, a revoluble feed wheel located in said casing, a removable auxiliary hopper, the lower end thereof being conformed to the contour of the periphery of said feed wheel and means for yieldingly holding said auxiliary hopper against the periphery of said wheel, substantially as specified.

4. In a seeding machine, a casing having a main hopper, a revoluble feed wheel located in said casing, an auxiliary hopper forming a continuation of said main hopper, the lower end thereof being conformed to the contour of the periphery of said feed wheel and means for yieldingly holding said auxiliary hopper against the periphery of said wheel, substantially as specified.

5. In a seeding machine, a casing having a main hopper, a revoluble feed wheel located in said casing, an auxiliary hopper forming a continuation of said main hopper, the walls of which are converged to form a narrow opening at the lower end thereof, the lower end of said auxiliary hopper being conformed to the shape of the feed wheel, and means for yieldingly holding said auxiliary hopper against the periphery of said wheel, substantially as specified.

6. In a seeding machine, a casing having a main hopper, a revoluble feed wheel located in said casing, said feed wheel having a depressed or grooved center, seed pockets located therein, a removable auxiliary hopper forming a continuation of said main hopper, the walls of said hopper being converged to form a narrow open end and shaped to conform to the contour of the depressed or grooved portion of said feed wheel and means for yieldingly holding said auxiliary hopper to said wheel, substantially as specified.

7. In a seeding machine, a casing having a main hopper, a revoluble feed wheel located in said casing, said feed wheel having a depressed or grooved center, a removable auxiliary hopper forming a continuation of said main hopper and fitted to the depressed or grooved portion of said feed wheel, said casing having a passageway at one side of said wheel, and a yieldable gate in said auxiliary hopper normally closing said passageway, substantially as specified.

8. In a seeding machine, a casing having a main hopper, a revoluble feed wheel located in said casing, a removable auxiliary hopper having a converged open bottom, a main conduit beneath said wheel and a removable auxiliary conduit located in said main conduit and being fitted to said wheel and formed with an opening adjacent thereto.

9. In a seeding machine, a casing having a main hopper, a revoluble feed wheel located in said casing, a removable auxiliary hopper, said auxiliary hopper having a converged open lower end fitted to the periphery of said feed wheel, said casing having a passageway at one side of said wheel, a main conduit beneath said wheel, a removable auxiliary conduit located therein and extended up through the passageway, said auxiliary conduit being fitted to said wheel and having an opening adjacent said wheel.

10. In a seeding machine, a casing having a main hopper, a revoluble feed wheel in said casing, a removable auxiliary hopper forming a continuation of said main hopper, said auxiliary hopper having a converged lower end fitted to the periphery of said feed wheel, said casing having a passageway at one side of said wheel, a main conduit beneath said wheel, a removable auxiliary conduit located therein and extended up through the passageway, said auxiliary conduit being fitted to said wheel and having an opening adjacent said wheel, substantially as specified.

11. In a seeding machine, a casing having a revoluble feed wheel located therein, a main conduit beneath said feed wheel, a central seed carrying surface on said feed wheel, and a removable auxiliary conduit located in said main conduit and communicating with the said carrying surface of said feed wheel, substantially as specified.

In testimony whereof, I have hereunto set my hand this 22nd day of January 1910.

CHARLES E. PATRIC.

Witnesses:
 CHAS. I. WELCH,
 MARTHA A. WIPERT.